United States Patent [19]

Hughes

[11] Patent Number: 5,734,518
[45] Date of Patent: *Mar. 31, 1998

[54] METHOD AND APPARATUS FOR DETERMINING DESIRED ROTATIONAL VELOCITY OF TAKE-UP REEL FOR HELICAL SCAN RECORDER

[75] Inventor: Timothy C. Hughes, Boulder, Colo.

[73] Assignee: Exabyte Corporation

[*] Notice: The term of this patent shall not extend beyond the expiration date of Pat. No. 5,689,382.

[21] Appl. No.: 476,367

[22] Filed: Jun. 7, 1995

Related U.S. Application Data

[63] Continuation-in-part of Ser. No. 150,733, Nov. 12, 1993, abandoned.

[51] Int. Cl.⁶ ................................................. G11B 5/596
[52] U.S. Cl. ...................... 360/70; 360/74.2; 360/77.13; 360/73.04
[58] Field of Search ........................ 360/74.2, 77.13, 360/73.08, 70, 73.04, 73.09, 73.11, 73.12, 73.14; 242/334.3

[56] References Cited

U.S. PATENT DOCUMENTS

| | | | |
|---|---|---|---|
| 3,657,707 | 4/1972 | McFarland et al. | 365/127 |
| 4,125,881 | 11/1978 | Eige | 360/50 |
| 4,341,363 | 7/1982 | Initome | 360/73.04 |
| 4,422,112 | 12/1983 | Tanaka | 360/75 |
| 4,777,413 | 10/1988 | Yoshimura | 242/334.3 |
| 4,794,473 | 12/1988 | Kawasaki | 360/70 |
| 4,805,053 | 2/1989 | Yamanaka et al. | 360/74.2 |
| 4,835,628 | 5/1989 | Hinz et al. | 360/48 |
| 4,843,495 | 6/1989 | Georgis et al. | 360/73.08 |
| 4,956,730 | 9/1990 | Arai | 360/70 |
| 4,963,999 | 10/1990 | Utsunominga | 360/74.2 |
| 4,985,786 | 1/1991 | Arai | 360/70 |
| 5,065,261 | 11/1991 | Hughes | 360/77.13 |
| 5,068,757 | 11/1991 | Hughes | 360/77.13 |
| 5,087,993 | 2/1992 | Kobayashi | 360/74.2 |
| 5,103,354 | 4/1992 | Singhoff et al. | 360/75 |
| 5,142,422 | 8/1992 | Zook et al. | 360/54 |
| 5,191,491 | 3/1993 | Zweighaft | 360/77.13 |
| 5,233,488 | 8/1993 | Yanagihara | 360/77.15 |
| 5,243,473 | 9/1993 | Lee | 360/69 |
| 5,291,364 | 3/1994 | Saito | 360/137 |
| 5,309,300 | 5/1994 | Lee | 360/74.2 |
| 5,355,263 | 10/1994 | Noguchi | 360/70 |
| 5,359,504 | 10/1994 | Ohmi et al. | 360/137 |

*Primary Examiner*—Aristotelis M. Psitos
*Assistant Examiner*—Alan Faber
*Attorney, Agent, or Firm*—Nixon & Vanderhye, P.C.

[57] ABSTRACT

Methods and apparatus are provided for determining a servo offset value and a take-up reel velocity for imparting a desired linear velocity to tape in a helical scan recording system (20). The helical scan recorder system records information on a magnetic tape (22), the magnetic tape being transported between a supply reel (24) and a take-up reel (26) in the helical scan recorder through a tape path, which tape path includes at least a partial wrapping of the tape around a drum (30) of the helical scan recorder. The methods include moving the tape from the supply reel to the take-up reel whereby the tape travels a predetermined displacement; rewinding the tape by the tape extraction displacement and determining an angular rewind displacement of the take-up reel; and using the determined displacements to ascertain parameters including a desired velocity of the take-up reel.

8 Claims, 12 Drawing Sheets

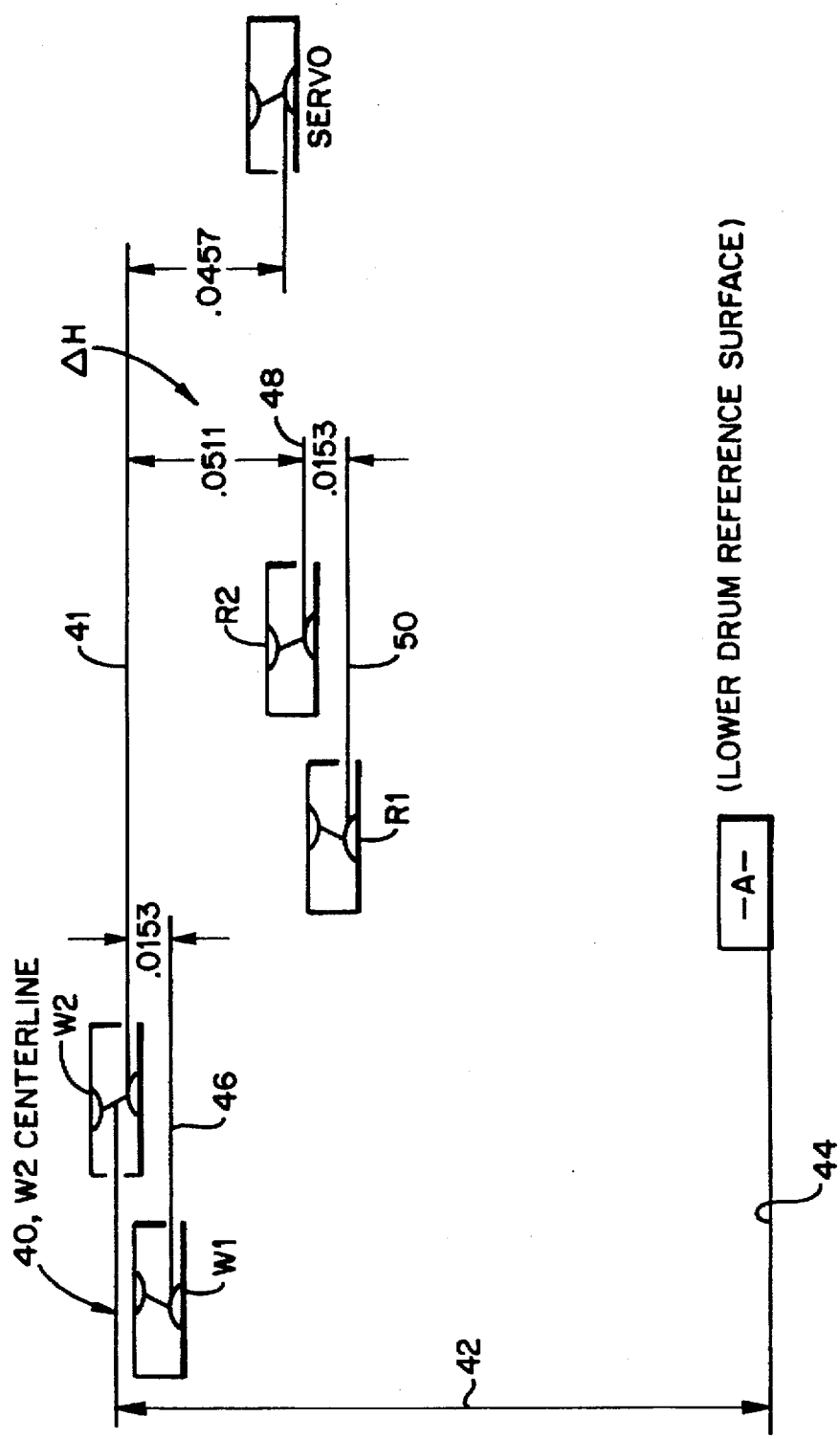

$\Delta H_{SPEC} - \Delta H_{ACTUAL}$ = AXIAL OFFSET VARIANCE (AOV)

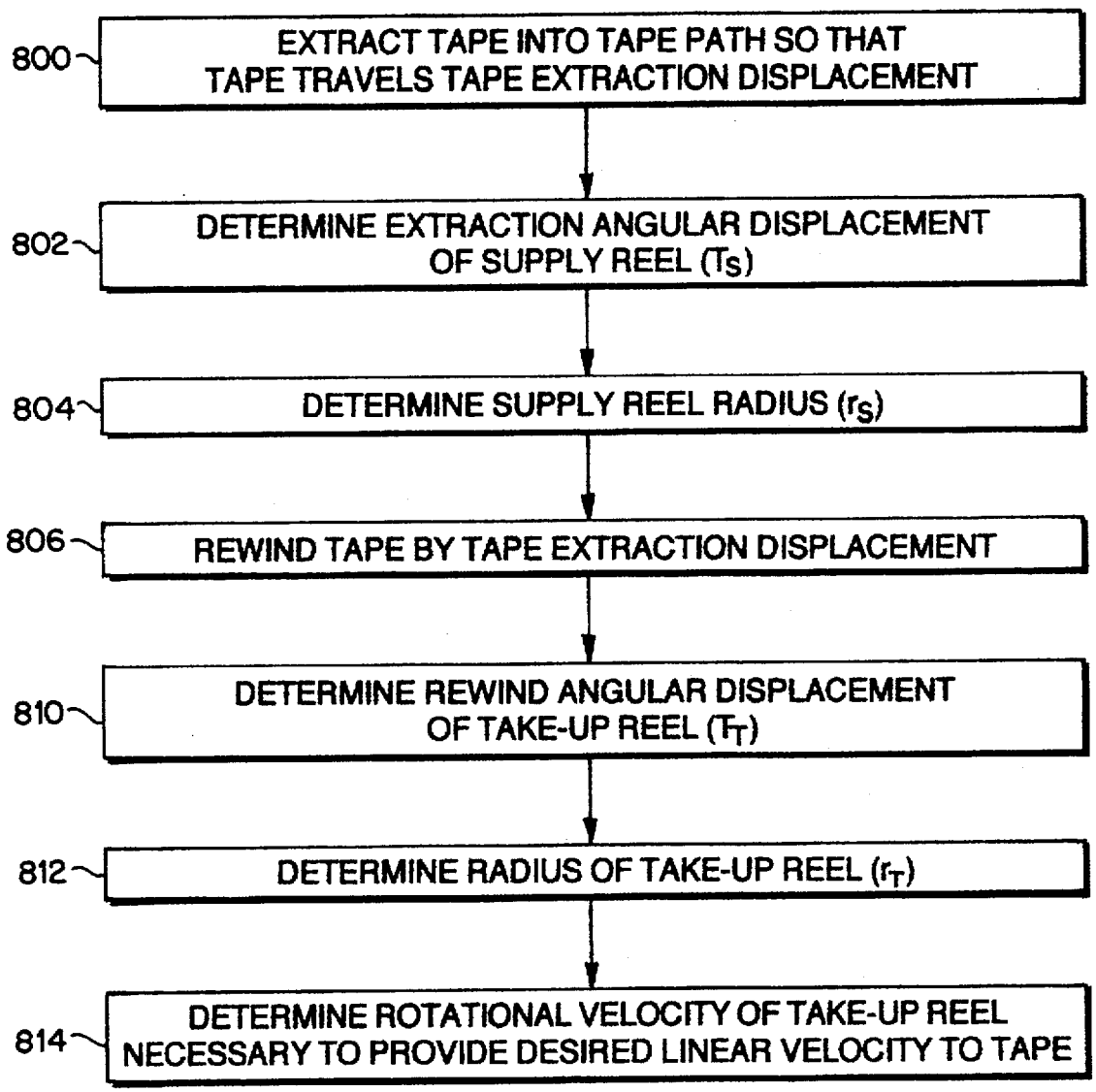

METHOD AND APPARATUS FOR DETERMINING DESIRED ROTATIONAL VELOCITY OF TAKE-UP REEL FOR HELICAL SCAN RECORDER

This application is a continuation-in-part of application Ser. No. 08/150,733, filed Nov. 12, 1993, and now abandoned.

This application is a continuation-in-part of U.S. patent application Ser. No. 08/150,733 entitled "METHOD AND APPARATUS FOR DETERMINING AND USING HEAD PARAMETERS IN A HELICAL SCAN RECORDER", filed Nov. 12, 1993 by Timothy Hughes and Fadi Y. Abou-Jaoude, now abandoned and incorporated herein by reference.

BACKGROUND

1. Field of Invention

This invention pertains to the operation of a helical scan recorder, and particularly for determining parameters of the helical scan recorder for enhancing performance thereof.

2. Related Art and Other Considerations

Numerous prior art patents and publications teach recording and reading of information stored in helical stripes (or "tracks") on magnetic storage media (e.g., magnetic tape). In a helical scan arrangement, travelling magnetic tape is at least partially wrapped around a rotating drum (or scanner) so that heads (both write head(s) and read head(s)) positioned on the drum are contiguous to the drum as the drum is rotated.

One or more write heads on the drum physically record data on the tape in a series of discrete tracks oriented at an angle with respect to the direction of tape travel. As used herein, track or stripe "pitch" means a distance between centerlines of two adjacent tracks, the centerlines of the tracks extending along the direction of head travel and the distances therebetween being taken perpendicularly to the centerlines. In a dual azimuth system, track pitch equates to the width of a track. The data on the track is formatted, prior to recording on the tape, to provide sufficient referencing information to enable later recovery during readout by one or more read heads.

Examples of helical scan recorders are shown, inter alia, in the following U.S. patents (all of which are incorporated herein by reference):

U.S. Pat. No. 4,835,628 to Hinz et al.
U.S. Pat. No. 4,843,495 to Georgis et al.
U.S. Pat. No. 5,065,261 to Hughes et al.
U.S. Pat. No. 5,068,757 to Hughes et al.
U.S. Pat. No. 5,142,422 to Zook et al.

On a drum of a helical scan recorder, the write head(s) are distanced from the read head(s) both by a radial distance and an axial distance (the axial distance being taken along the major axis of the drum). The separation of the write head and read head along the major axis of the drum is herein denoted as the "axial offset" or "axial offset distance". Although a helical scan recorder is intended to be manufactured to have a specification axial offset distance, it generally turns out that the drum of a helical scan recorder as manufactured has an actual axial offset distance which varies from the specification axial offset distance. As used herein, "axial offset variance" means the differential between (1) a desired (e.g., specification or reference) axial offset distance by which a write head is supposed to be separated from a read head on the drum along the drum axis, and (2) an actual axial offset distance by which a write head is actually separated from a read head on the drum along the drum axis.

To the extent that axial offset variance has been measured in the prior art, such measurements have taken the form of imprecise gauging with the use of optical measurement devices such as a high power microscope. However, the margin of error of such measurement devices is greater than the precision required for use in a helical scan recorder.

Axial offset variance has importance for a number of reasons. For example, axial offset variance is a factor which complicates write splice operations. In a write splice, the recorder must start recording exactly at a point ("splice location") at which the previous recording had stopped. To maximize media usage, the junction of new data to old data must be seamless, so that track pitches are continuous.

If there is no axial offset variance (e.g., axial offset variance=0), track pitch uniformity can easily be obtained at the write splice location. However, even a small axial offset variance (for example, two microns) will result in nonuniformity of track pitch at the write splice location. Subsequent read operations in the neighborhood of the write splice location can cause servoing problems, particularly if several splices are close together.

Axial offset variance also can be a factor in determining linear tape speed in certain helical scan recorders, such as a capstanless helical scan recorder. In this regard, see abandoned U.S. patent application Ser. No. 08/150,726 filed Nov. 12, 1993 of Georgis and Zweighaft entitled "Method And Apparatus For Controlling Linear Tape Speed In A Helical Scan Recorder" (incorporated herein by reference and now abandoned).

As related but not necessarily prior art, U.S. patent application Ser. No. 08/150,733 entitled "METHOD AND APPARATUS FOR DETERMINING AND USING HEAD PARAMETERS IN A HELICAL SCAN RECORDER", filed Nov. 12, 1993 by Timothy Hughes and Fadi Y. Abou-Jaoude, and incorporated herein by reference and now abandoned, discloses various methods of calibrating a helical scan recorder. The methods include transporting the media past a drum at a controlled linear velocity and recording tracks on the media using a write head during a first angular portion of a drum revolution. During a second angular portion of a drum revolution, servo signals are read. The servo signals are used to determine an axial offset variance for the write head and the read head on the drum.

In one mode of the invention of abandoned U.S. patent application Ser. No. 08/150,733 wherein the helical scan recorder has a fixed-radius, motor-driven capstan and the tracks are read back within 180 degrees of recordation, the servo signals obtained during the media write operation are used to obtain a first interim value q(B−K3), in which B is a head overlap on a second of two servo-bearing tracks, q is an output voltage per micrometer of track overlap, and K3 is the axial offset variance. The storage media is then rewound, and the media transported past the drum at the controlled linear velocity while a media read operation is conducted. In the media read operation, tracks recorded on the tape are read and servo signals recorded thereon are used to obtain further interim values A, B (A being the head overlap on a first of the servo-bearing tracks). The first interim value and the second interim value are then used to determine a value indicative of the axial offset variance.

Another mode of the invention of abandoned U.S. patent application Ser. No. 08/150,733 concerns a helical scan recorder which does not have a capstan, and wherein the tracks are read back at least 540 degrees after recordation. In this mode, the drum of the capstanless recorder is installed in a test device such as another helical scan recorder in which media can be transported past the drum at a controlled linear velocity. Tracks are recorded on the media at the controlled linear velocity using the write head. Servo signals recorded on two tracks are read back at least 540 degrees later. The servo signals from the two tracks are used to determine a value indicative of an axial offset variance of the write head and the read head on the drum. The drum is then removed from the controlled velocity recorder and installed in the capstanless recorder. A value indicative of the axial offset variance is stored in a memory of the capstanless helical scan recorder. The stored value indicative of the axial offset variance can then be used to control linear velocity of the storage media in the capstanless recorder and to attain uniform track pitch during a write splice operation.

In yet another mode of the invention of abandoned U.S. patent application Ser. No. 08/150,733, a fixed length calibration tape having length corresponding to a predetermined number of tracks (e.g., of predetermined calibration information) is installed in the recorder. Then, the recorder records information (e.g., the predetermined calibration information) on the installed fixed length calibration tape. A number of tracks actually recorded is then determined, and compared with the predetermined number of tracks which perfectly fit on the calibration tape. The comparison is then used to obtain a parameter related to axial offset variance.

A write splice operation according to the invention of abandoned U.S. patent application Ser. No. 08/150,733 involves reading tracks previously recorded on a storage media and using a stored value indicative of the axial offset variance in order to control positioning of the write head. Write head positioning is controlled so that a track subsequently recorded at the write splice location will have uniform track pitch with tracks previously recorded upstream from the write splice location. A track of uniform pitch is then recorded at the write splice location.

SUMMARY

Methods and apparatus are provided for determining a servo offset value and a take-up reel velocity necessary for imparting a desired linear velocity to tape in a capstanless helical scan recording system. The helical scan recorder system records information on a magnetic tape, the magnetic tape being transported between a supply reel and a take-up reel in the helical scan recorder through a tape path, which tape path includes at least a partial wrapping of the tape around a drum of the helical scan recorder.

The method of determining a servo offset value includes moving the tape from the supply reel to the take-up reel whereby the tape travels a predetermined displacement; rewinding the tape by the tape extraction displacement; then moving the tape from the supply reel to the take-up reel by the predetermined displacement while recording servo information on two adjacent servo-bearing tracks of the tape; reading the servo information recorded on the two adjacent tracks and using the read servo information to determine a servo offset value; then adjusting the servo offset value so that a number of revolutions N of the drum which occurs during the writing/reading is within a predetermined range. The adjusted servo offset value is then used to control positioning of a head of the helical scan recorder.

In a preferred embodiment, the predetermined displacement is a tape extraction displacement obtained during extraction of the tape into the tape path. The servo offset value is used in one embodiment to determine an axial offset variance for the helical scan recorder.

In one mode of the invention, the method further comprises determining an angular displacement of the supply reel during tape extraction; determining a rewind angular displacement of the take-up reel as a result of the rewinding; using the determination angular displacement of the supply reel and the determination of the rewind angular displacement of the take-up reel to determine a ratio of radii of the supply reel and the take-up reel; and then using the ratio to determine the velocity for moving the tape from the supply reel to the take-up reel.

To determine tape velocity in a helical scan recorder during a mid-tape load, tape is extracted into a tape path of the helical scan recorder, whereby the tape travels a predetermined tape extraction displacement. An extraction angular displacement of the supply reel necessary to extract the tape into the tape path is then determined, which in turn is used to determine the radius of the supply reel. Thereafter, the tape is rewound by an amount corresponding to the tape extraction displacement. A rewind angular displacement of the take-up reel is then determined as a result of the rewinding, which in turn can be used to determine the radius of the take-up reel. With the radius of the take-up reel known, the rotational velocity of the take-up reel necessary to achieve the desired tape linear velocity can be determined.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A is a schematic view of a circumferential surface of a drum utilized in the helical scan recording system of FIG. 1A, the drum appearing as if its circumferential surface were cut and unrolled in planar fashion.

FIG. 4C is a schematic view heads traversing helical stripes having a guardband in the helical scan recording system of FIG. 1B.

FIG. 8 is a flowchart showing steps executed in connection with a mid-tape load velocity determination of the present invention.

DETAILED DESCRIPTION OF THE DRAWINGS

Figure 1A:
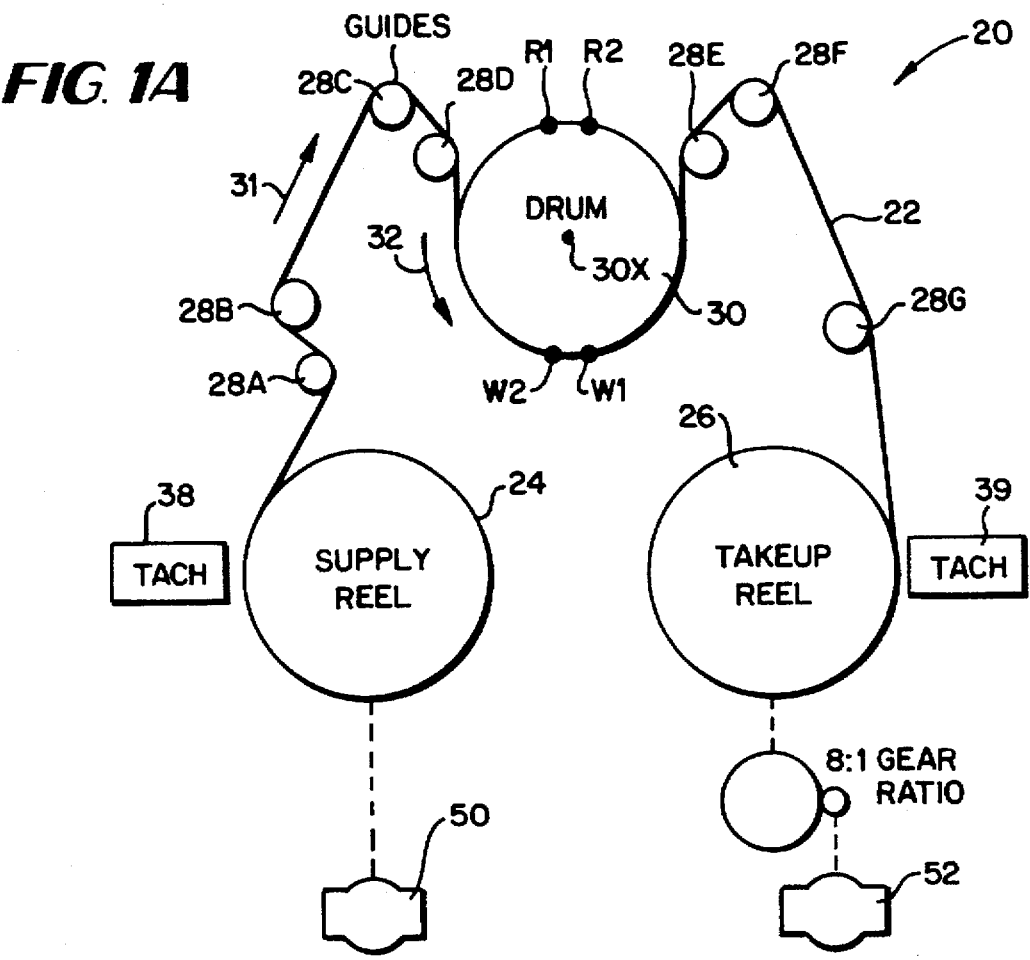
FIG. 1A is a schematic view of portions of a capstanless helical scan recording system according to an embodiment of the invention wherein tape is loaded into a tape path.
Figure 1B:
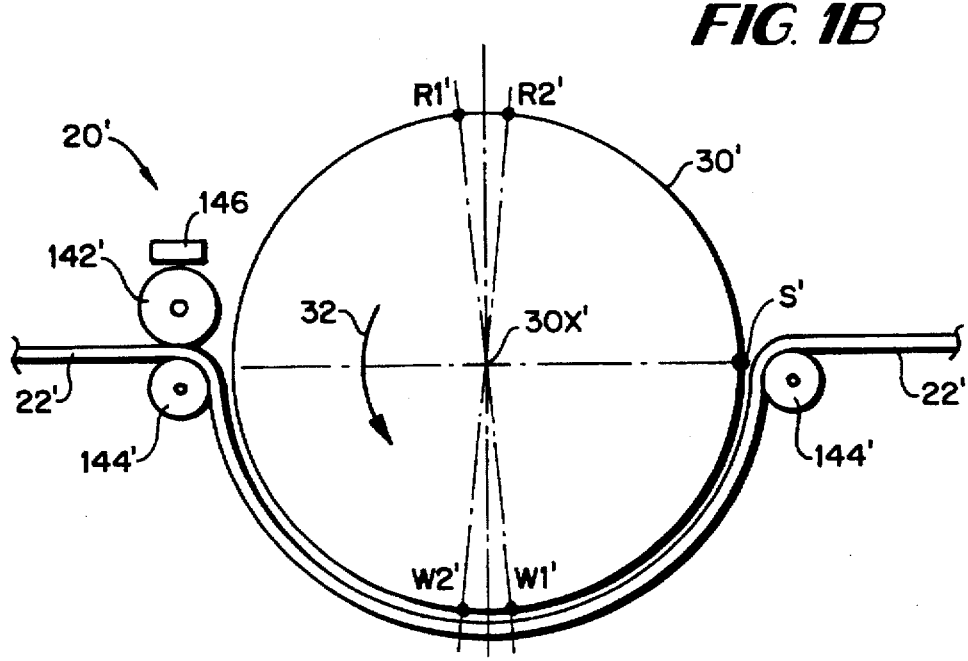
FIG. 1B is a schematic view of portions of a helical scan recording system having a capstan according to an embodiment of the invention wherein tape is loaded into a tape path.
Figure 1C:
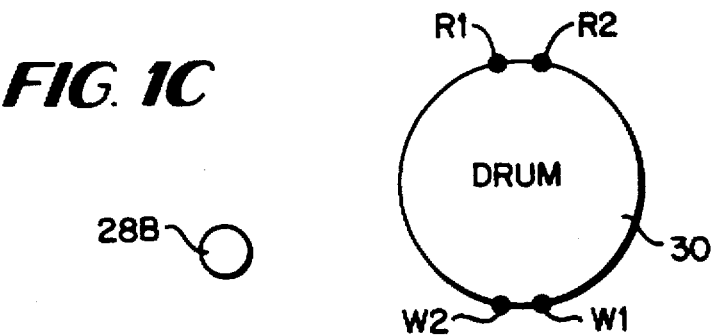
FIG. 1C is a schematic view the capstanless helical scan recording system of FIG. 1A prior to tape being loaded into a tape path.

FIG. 1A and FIG. 1C show portions of a capstanless tape path for a helical scan recording system generally depicted by reference numeral 20. In particular, FIG. 1A shows a magnetic tape 22 (such as an 8 mm magnetic tape, for example) having a first end wound around a supply reel 24 and a second end wound around a take-up reel 26. In FIG. 1A, tape 22 is loaded into its loaded tape path, whereas in FIG. 1C tape 22 is unloaded.

The loaded path traversed by tape 22 in FIG. 1A is defined at least in part by a series of tape guides 28A–28G and a rotating scanner or drum 30. Drum 30 has a drum major axis 30X. In all operations excepting a rewind operation, tape 22 travels from supply reel 24 to take-up reel 26 in the direction depicted by arrow 31.

U.S. Pat. No. 5,602,694 of Robert J. Miles and James Zweighaft entitled "Capstanless Helical Drive System" (incorporated herein by reference) provides a detailed understanding of the particular capstanless tape path partially depicted in FIG. 1A.

Figure 4A:
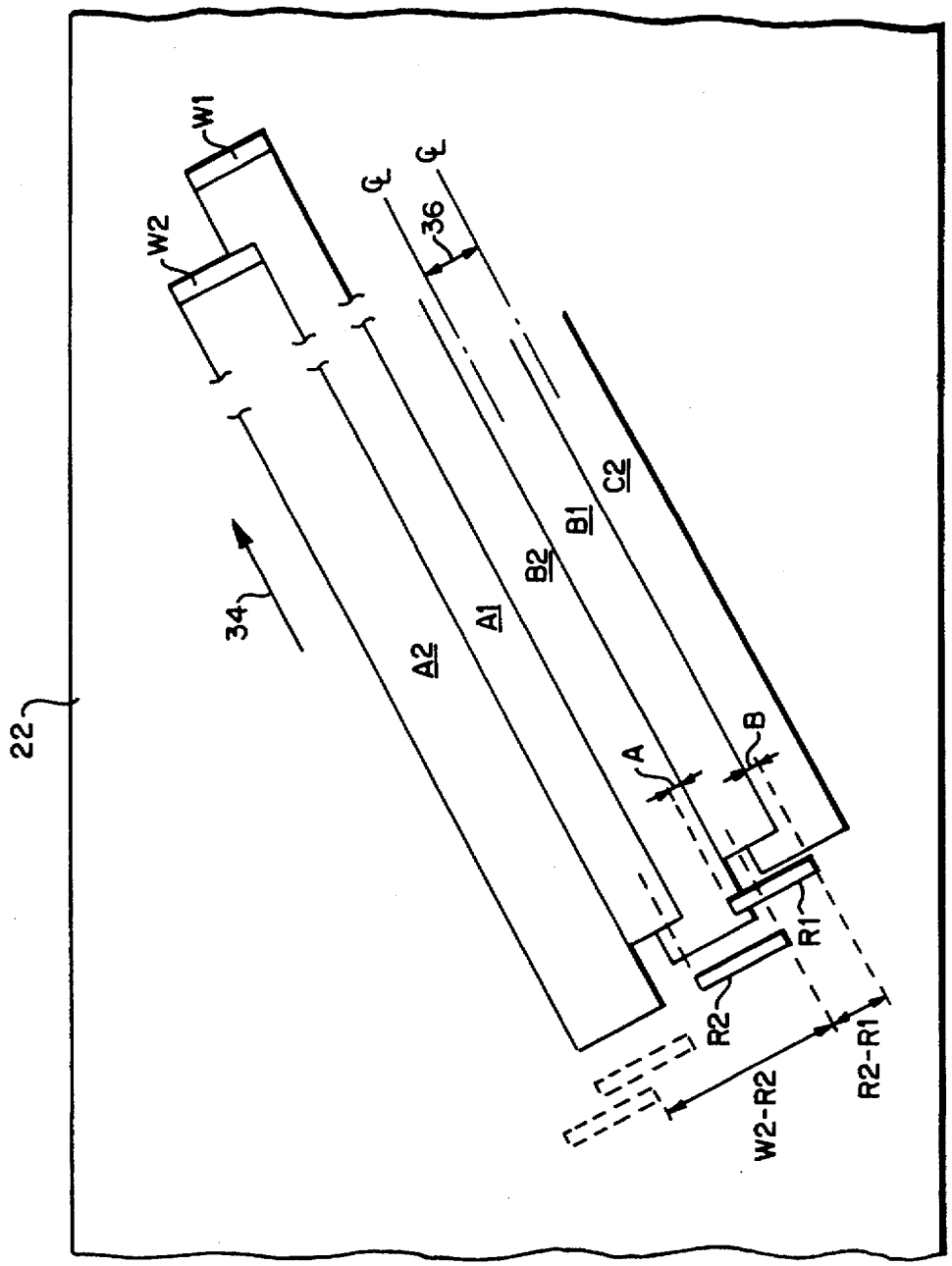
FIG. 4A is a schematic view of heads traversing dual azimuth helical stripes in the helical scan recording system of FIG. 1A.
Figure 4B:
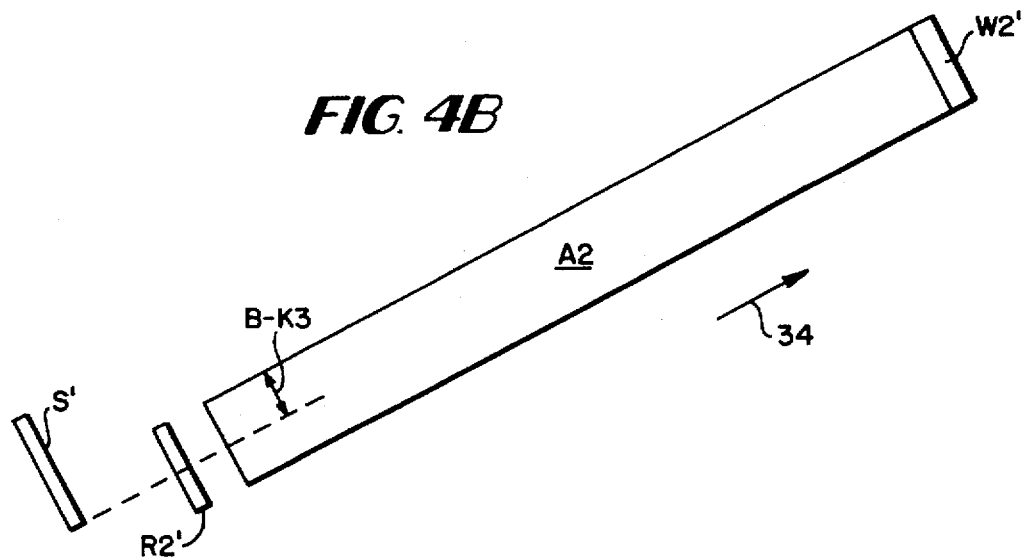
FIGS. 4B and 4C are schematic views of heads in recording and reading operations, respectively, with a guardband format in the helical scan recording system of FIG. 1B.
Figure 4C:
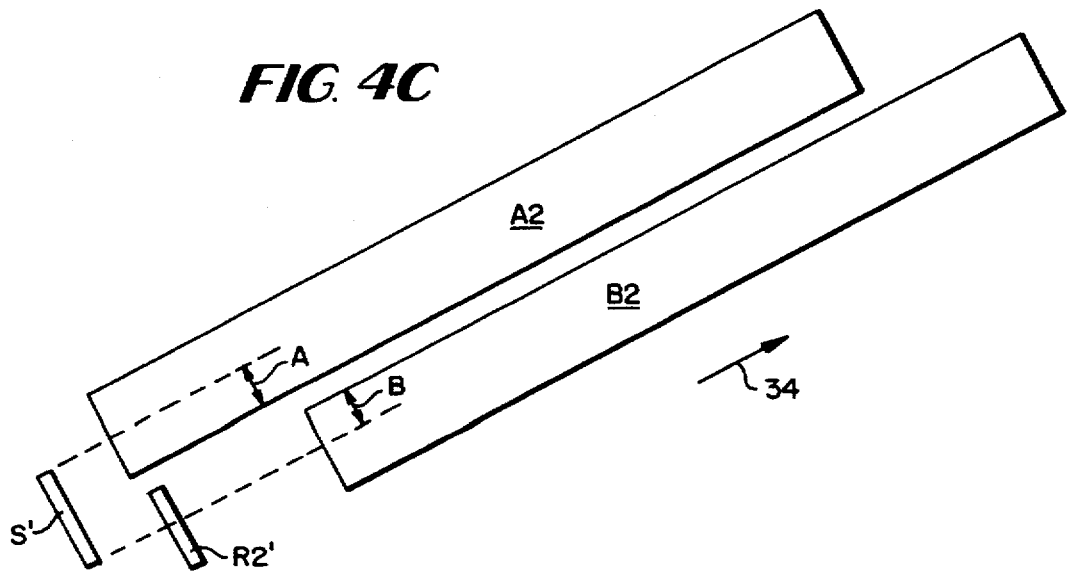

As shown both in FIG. 1A and FIG. 2A, drum 30 has read heads R1 and R2 as well as write heads W1 and W2 mounted on the circumference thereof (the exact positioning of which will be described below). Drum 30 rotates in the direction depicted by arrow 32. As drum 30 rotates, at any moment a portion of its circumference is in contact with travelling tape. During a recording or write operation, write heads W1 and W2 are periodically positioned to record "stripes" or "tracks" (such as tracks C2, B1, B2, A1, and A2 shown in FIG. 4A) as heads W1 and W2 move in a direction of head travel (depicted by arrow 34 in FIG. 4A) across tape 22. FIG. 4A also depicts track pitch (depicted by arrow 36 in FIG. 4A) which (in the illustrated dual azimuth system) is also essentially the width of the track (after recordation of neighboring tracks) in a direction perpendicular to the track centerline (the track centerline optimally being parallel to direction 34).

FIG. 4A also illustrates overlap of read head R1 onto adjacent tracks. In particular, read head R1 has an overlap "A" onto adjacent track B2 (for reading off-azimuth servo signals recorded on track B2) on an overlap "B" onto adjacent track C2 (for reading off-azimuth servo signals recorded on track C2).

FIG. 1A also shows that a supply reel tachometer 38 is provided for supply reel 24 and a take-up reel tachometer 39 is provided for take-up reel 26. As understood from U.S. Pat. No. 5,602,694 of Robert J. Miles and James Zweighaft entitled "Capstanless Helical Drive System" (incorporated herein by reference), each reel has a rotor assembly with a tachometer ring provided thereon. The tachometers 38, 39 are positioned to interface with the tachometer rings on respective reels 24, 26 for providing signals relative to the rotational speed of the respective reels 24, 26.

Helical scan system 20 uses a read-after-write procedure as disclosed in abandoned U.S. patent application Ser. No. 08/150,726 (filed Nov. 12, 1993) of Georgis and Zweighaft entitled "Method And Apparatus For Controlling Media Linear Speed In A Helical Scan Recorder" (incorporated herein by reference).

FIG. 2A is a schematic depiction of specification-prescribed vertical (e.g., axial) positionings of heads W1, W2, R1 and R2 on drum 30 of the embodiment of FIG. 1A. FIG. 2A shows drum 30 as if its circumferential surface were cut and rolled out in planar fashion. In FIG. 2A, a centerline 40 of head W2 is shown per specification to be located a distance 42 above a drum reference surface 44 (e.g., the lower axial surface of drum 30). FIG. 2A further shows that a lower edge line 46 of head W1 per specification is located a distance 15.3 microns below lower edge line 41 of head W2; that a lower edge line 48 of head R2 per specification is located a distance 51.1 microns below lower edge line and, that a lower edge line 50 of head R1 per specification is located a distance 15.3 microns below lower edge line The distance separating the lower edge lines 41 and 48 along the axis of the drum, known as the "head 2 offset" or "axial offset distance", is depicted by the distance $\Delta H$.

Placement of heads W1, W2, R1 and R2 on drum 30 results in the formation of tracks as shown in FIG. 4A. In particular, as tape 22 travels past rotating drum 30, heads W1, W2, R1 and R2 travel in the direction shown by arrow 34. In view of the axial offsets of the heads as described with reference to FIG. 2A, FIG. 4A shows that as write heads W1 and W2 finish recording their respective tracks A1 and A2 during a first half of a drum revolution, read heads R1 and R2 are almost ready to begin (during the second half of the same drum revolution) read-back of tracks B1 and B2, respectively. Tracks B1 and B2 about-to-be-read by heads R1 and R2 respectively in FIG. 4A were written during the revolution of drum 30 which preceded the revolution during which tracks A1 and A2 were recorded. Hence, for any track, its read-after-write reading by heads R1 and R2 occurs 540 degrees of revolution of drum 30 after the track is recorded. By now it should be apparent that FIG. 4A illustrates tracks having the numerical suffix "1" as being written by head W1 and subsequently read back by head R1. Similarly, tracks having the numerical suffix "2" are written by head W2 and subsequently read back by head R2.

Although not illustrated herein, it should be understood that servo zones are recorded on at least selected tracks. In the illustrated embodiment, servo zones are recorded on tracks written by write head W2. A more detailed understanding of the servo zones utilized by the helical scan system 20 of FIG. 1A can be gleaned from U.S. patent application Ser. No. 08/150,726 (filed Nov. 12, 1994) of Georgis and Zweighaft entitled "Method And Apparatus For Controlling Media Linear Speed In A Helical Scan Recorder" (incorporated herein by reference and now abandoned).

Figure 3A:
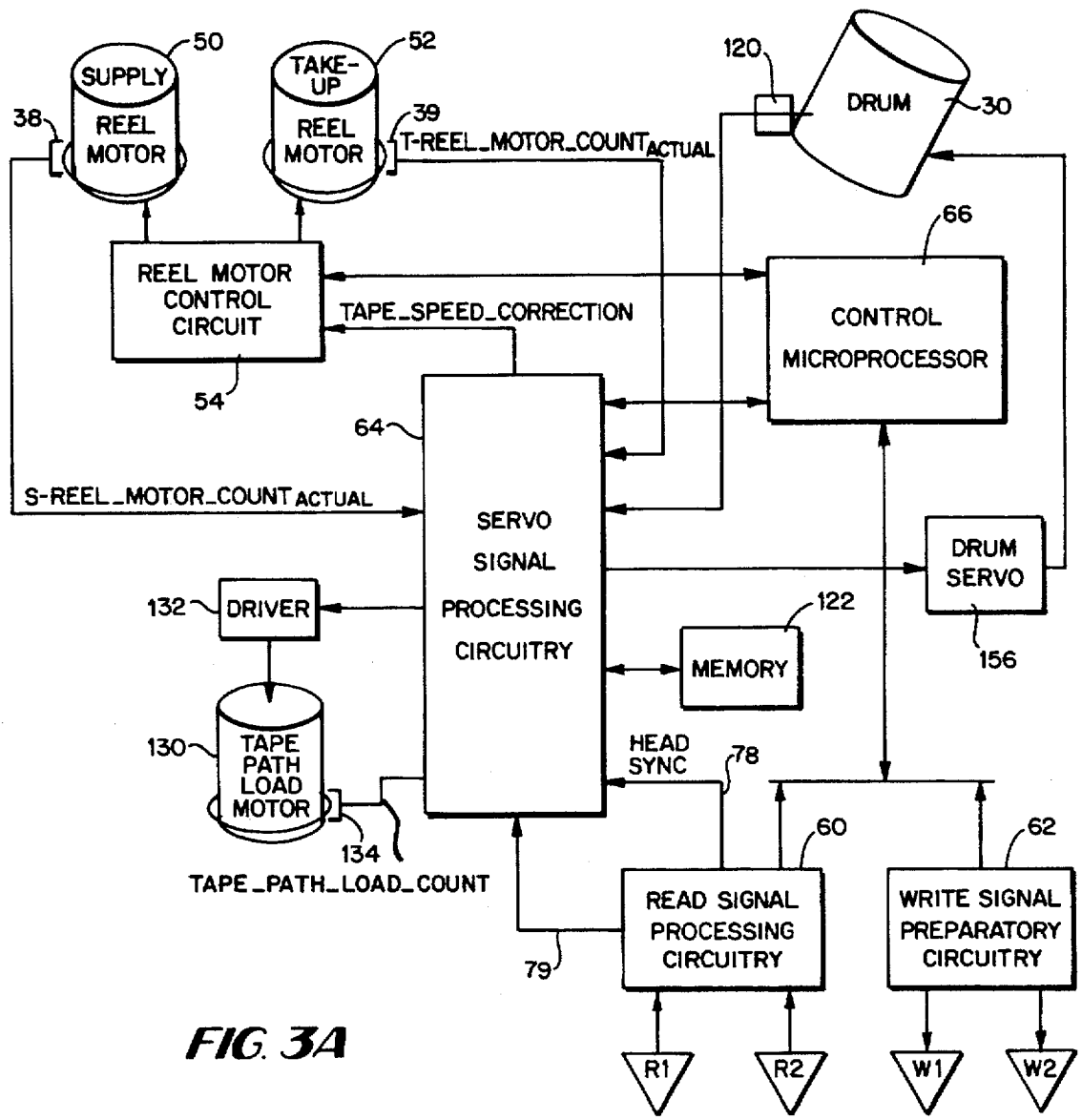
FIG. 3A is a schematic view of a portion of electronics included in the helical scan recording system of FIG. 1A.

FIG. 3A shows electronics of the tape drive system 20 of the embodiment of FIG. 1A, including reel motor 50 for rotating supply reel 24 and reel motor 52 for rotating take-up reel 26 and a reel motor control circuit 54. In addition, FIG. 3A shows read signal processing circuitry 60 involved in processing signals obtained from read heads R1 and R2; write signal preparatory circuitry 62; and servo signal processing circuitry 64; all under direction of control microprocessor 66. Servo signal processing circuitry 64 is connected to drum servo 156. Drum servo 156, in turn, has an output signal for indicating position of heads relative to drum 30.

Details of the read signal processing circuitry 60, write signal preparatory circuitry 62, and servo signal processing circuitry 64 are more fully discussed in U.S. patent application Ser. No. 08/150,726 (filed Nov. 12, 1994) of Georgis and Zweighaft entitled "Method And Apparatus For Controlling Media Linear Speed In A Helical Scan Recorder" (incorporated herein by reference and now abandoned).

As further shown in FIG. 3A, servo signal processing circuitry 64 is connected to receive the signal T-reel__motor__count$_{actual}$ from take-up reel tachometer 39 and the signal S-reel__motor__count$_{actual}$ from supply-reel tachometer 38. Further, servo signal processing circuitry 64 receives a signal drum__speed from a tachometer 120 which is used to monitor revolutions of drum 30. In addition, servo signal processing circuitry 64 has access to non-volatile memory 122 in which are stored various values and constants, including a constant K3 (axial offset variance) here of interest. Also, alternatively, drum__speed can be presumed to be a constant and stored in memory 122.

FIG. 3A also shows that tape drive system 20 includes tape path load motor 130, which is used to operate mechanisms for moving tape guides 28A, 28C–28G from the unloaded position shown in FIG. 1C to the loaded position shown in FIG. 1A. Tape path load motor 130 is operated by a signal output from servo signal processing circuitry 64 via driver 132. Tape path load motor 130 has its own tachometer 134, which outputs a signal tape__path__load__count indicative of the degree of extension/retraction of tape guides 28A, 28C–28G. Servo signal processing circuitry 64 utilizes the signal signal tape__path__load__count to determine when a tape load has been completed.

An output terminal of servo signal processing circuitry 64 applies a signal tape__speed__correction to reel motor control circuit 54. Examples of structural details of reel motor control circuit 54 are provided in U.S. Pat. No. 5,426,355 of James Zweighaft entitled "Power-Off Motor Deceleration Control System" as well as in U.S. patent application Ser. No. 08/150,731 (filed Nov. 12, 1993 and now abandoned) of James Zweighaft et al. entitled "High Performance Power Amplifier", both of which are incorporated herein by reference.

FIG. 1B shows portions of a capstan-utilizing tape path for a helical scan recording system generally depicted by reference numeral 20'. In discussing the embodiment of FIG. 1B and its related drawings FIG. 2B and FIG. 3B, structural members having functions analogous to those of the embodiment of FIG. 1A bear analogous (but primed) reference numerals. In addition to other differences specifically discussed herein, system 20' of FIG. 1B includes a capstan 142' as well as tape guides 144'. Capstan 142' has an associated capstan tachometer 146'. Capstan 142' imparts a precise linear velocity to tape 22', which linear velocity is known with reference to output from capstan tachometer 146'. Further, unlike system 20, system 20' uses its servo head S' to read servo zones recorded on tracks written by head W2.

Although unillustrated in FIG. 1B, it should be understood that helical scan recording system 20' includes a supply reel and a take-up reel, with the supply reel having an associated supply reel tachometer 38' and the take-up reel having an associate take-up reel tachometer 39' (see FIG. 3B) in like manner as shown in FIG. 1A.

Figure 2B:
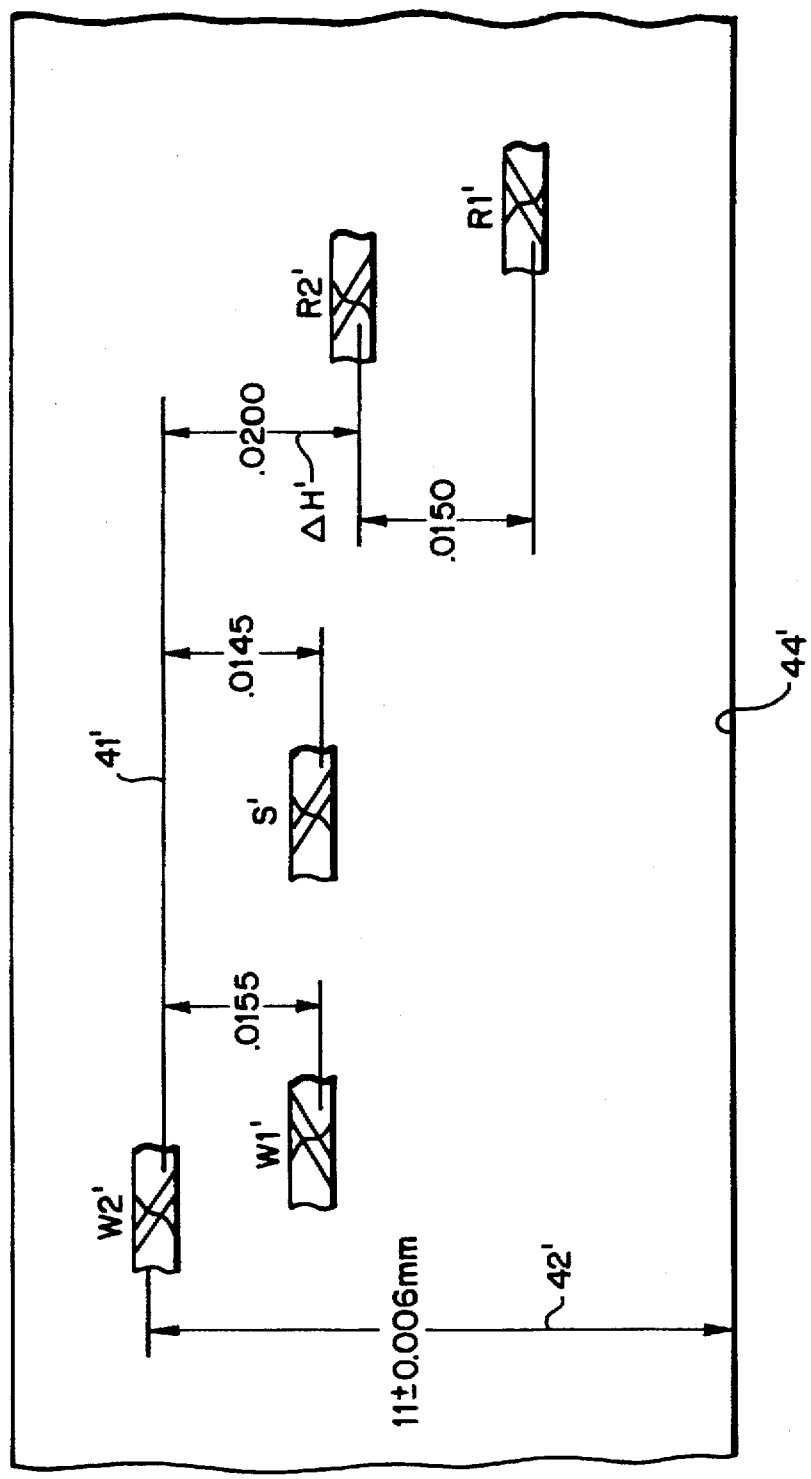
FIG. 2B is a schematic view of a circumferential surface of a drum utilized in the helical scan recording system of FIG. 1B, the drum appearing as if its circumferential surface were cut and unrolled in planar fashion.
Figure 3B:
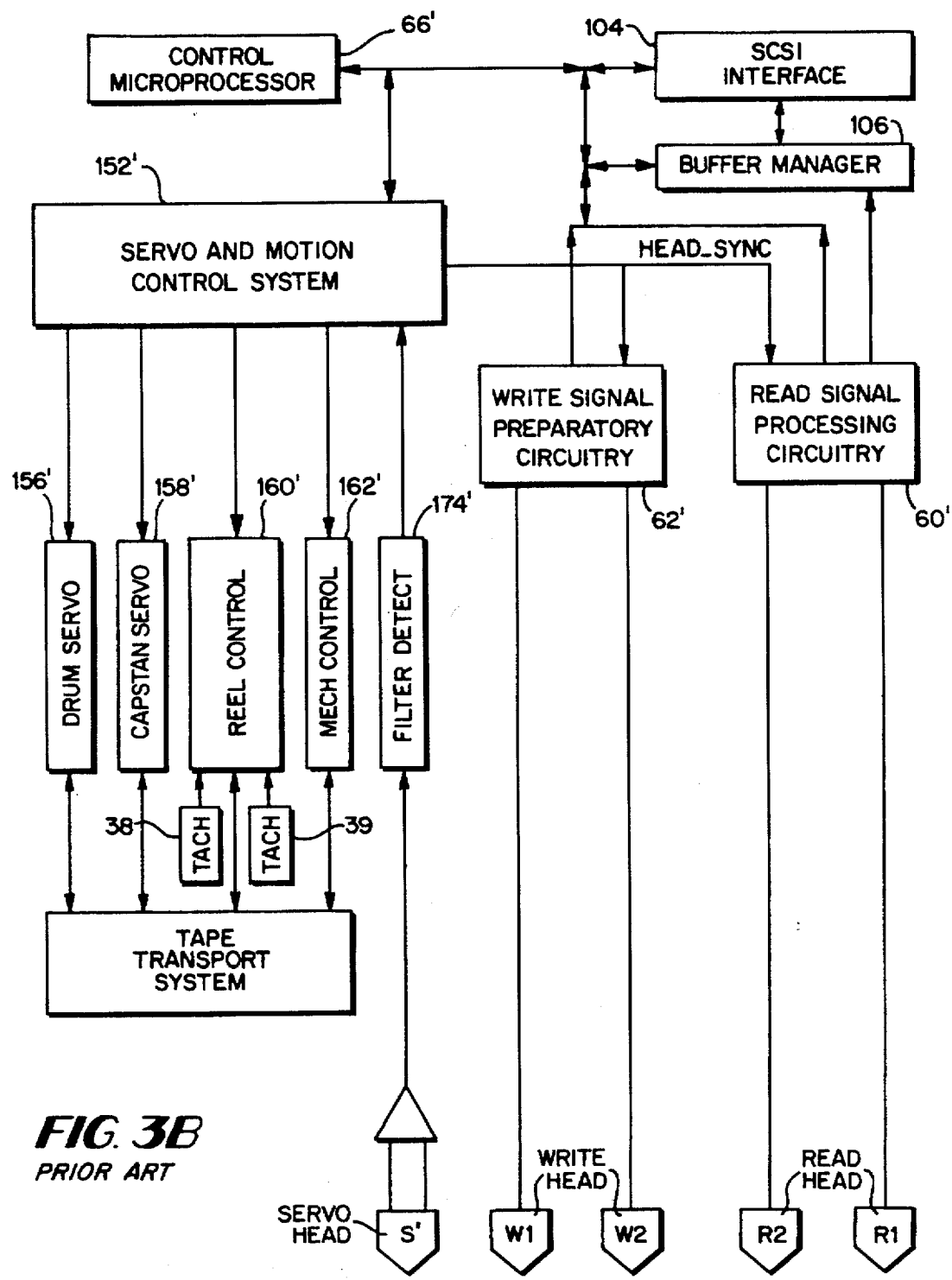
FIG. 3B is a schematic view of a portion of electronics included in the helical scan recording system of FIG. 1B.

FIG. 2B, in like manner as FIG. 2A, is a schematic depiction specification-prescribed vertical positioning of heads W1', W2', R1' and R2' on drum 30' including the "axial offset distance" ΔH'. As explained in abandoned U.S. patent application Ser. No. 08/150,726 (filed Nov. 12, 1993) of Georgis and Zweighaft entitled "Method And Apparatus For Controlling Media Linear Speed In A Helical Scan Recorder" (incorporated herein by reference), the axial spacings of heads in the embodiment of FIG. 1A differs from the axial spacings of heads in the embodiment of FIG. 1B, with the result that for any track, a read-after-write procedure occurs during subsequent revolutions of drum 30 after the track is written (e.g., intervening tracks are recorded before a track is read for checking).

Similar to the embodiment of FIG. 1A, the embodiment of FIG. 1B has electronics which includes write signal preparatory circuitry 62' and read signal processing circuitry 60', as well as a control microprocessor 66'. In addition, electronics of the embodiment of FIG. 1B includes a SCSI interface 104'; a buffer manager 106'; and servo motion and control system 152'. Servo motion and control system 152' controls the following sub-systems: drum servo 156'; capstan servo 158'; reel control 160'; mechanical control 162'; and, servo filter detector 174'.

Figure 7:
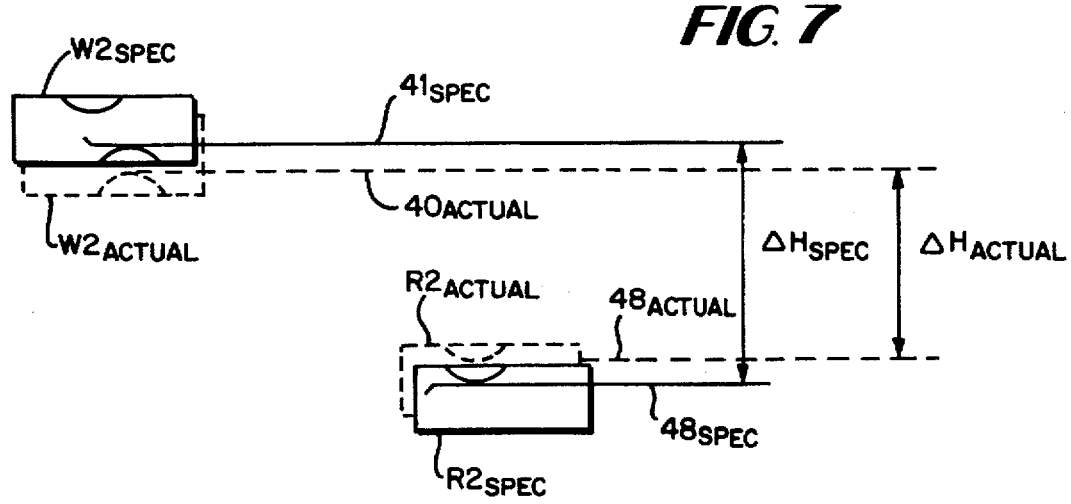
FIG. 7 is a schematic view depicting axial offset variance with reference to an exemplary drum of a helical scan recorder.

FIG. 7 illustrates axial offset variance for an exemplary drum of a helical scan recorder. In other words, FIG. 7 generically represents, for example, drums of helical scan recorders including both the drum 30 of the embodiment of FIG. 1A and drum 30' of the embodiment of FIG. 1B. FIG. 7 contrasts the specification-prescribed positions of heads $W2_{SPEC}$ and $R2_{SPEC}$ with the actual positions $W2_{ACTUAL}$ and $R2_{ACTUAL}$ (heads $W2_{ACTUAL}$ and $R2_{ACTUAL}$ being represented by broken lines). In addition, FIG. 7 contrasts the manufacturing specification axial offset distance $\Delta H_{SPEC}$ and the actual axial offset distance $\Delta H_{ACTUAL}$. As illustrated in FIG. 7, $$\Delta H_{SPEC} - \Delta H_{ACTUAL} = \text{Axial Offset Variance (AOV)}.$$

While in FIG. 7 the actual placement of heads $W2_{ACTUAL}$ and $R2_{ACTUAL}$ are shown to be closer together than desired by specification, other types of variances may be encountered (e.g., heads $W2_{ACTUAL}$ and $R2_{ACTUAL}$ may be further apart than intended).

Consider, for example, FIG. 7 and FIG. 4A in context of the embodiment of FIG. 1A. In the FIG. 1A embodiment, $\Delta H_{SPEC} = 51.10$ microns. To perform a write splice, a helical scan recorder built perfectly to specification (i.e., AOV =0) would track in a read operation by setting servo amplitudes equal (e.g., 1:1), corresponding to a specification required 4.75 micron overlap in each adjacent track (i.e., overlap A=overlap B in FIG. 4A). At the write splice location, the specification-perfect helical scan recorder would switch to a record operation, and create a continuous splice the track after the splice would have the same pitch as the (e.g., track before the splice).

If, in contrast to a specification-perfect recorder, an actual helical scan recorder has an axial offset variance of (for example) 2 microns, at the write splice location the first newly recorded track will have a width (i.e., pitch) that differs from the adjacent tracks by 2 microns.

in the above situation, if the axial offset variance could be reliably measured, then compensation for the axial offset variance is made according to the present invention by purposely positioning back by the axial offset variance. This is done by positioning the tape to create unequal servo amplitudes. For example, if the nominal overlap is supposed to be 4.75 microns and AOV=2 microns, the tape can be positioned to create unequal servo amplitudes in the ratio of (4.75+2)/(4.75):(4.75−2)/(4.75)

or 1.4:0.6.

To use this criteria, first define the nominal read tracking servo objective as striving to make this equation equal to:

$$q(A_{SPEC}-B_{SPEC})/(A_{SPEC}+B_{SPEC})=0 \quad \text{[Equation 1]}$$

where "$A_{SPEC}$" is a specification overlap of read head R1 on a first adjacent track (e.g., track B2 in FIG. 4A); "$B_{SPEC}$" is a specification overlap of read head R1 on a second adjacent track (e.g., track C2 in FIG. 4A); and "q" is servo output voltage per micron of track overlap. The determination of "q" is made by first measuring the output for full overlap.

Considering now the inclusion of the axial offset variance K3 to the read tracking servo criteria, let $$A_{ACTUAL}=A_{SPEC}+K3$$

$$B_{ACTUAL}=B_{SPEC}-K3$$

which, upon substitution into Equation 1, yields Equation 2. Equation 2:

$$q(A_{ACTUAL}-B_{ACTUAL})/(A_{ACTUAL}+B_{ACTUAL})=q(A_{SPEC}-B_{SPEC}+2*K3)/(A_{SPEC}+B_{SPEC})$$

Since $A_{SPEC}=B_{SPEC}$, and since $A_{ACTUAL}+B_{ACTUAL}=A_{SPEC}+B_{SPEC}$, then $$q(A_{ACTUAL}-B_{ACTUAL})=2q*K3 \quad \text{[Equation 3]}$$

The servo thus cancels out the effect of axial offset variance by measuring the actual overlaps $A_{ACTUAL}$ and $B_{ACTUAL}$ and setting the above equation equal to 2q*K3.

As seen below, this servo criteria offset 2q*K3 is used to obtain uniform track pitch when write splicing in both the embodiment of FIG. 1A and FIG. 1B. In addition, the value K3 can be computed and used in connection with tape linear velocity determination (and hence used to ensure uniformity of track pitch during even an ordinary write operation in a capstanless system), as explained in abandoned U.S. patent application Ser. No. 08/150,726 (filed Nov. 12, 1993) of Georgis and Zweighaft entitled "Method And Apparatus For Controlling Linear Tape Speed In A Helical Scan Tape Recorder" (incorporated herein by reference).

AXIAL OFFSET VARIANCE (AOV) DETERMINATIONS

Figure 5:
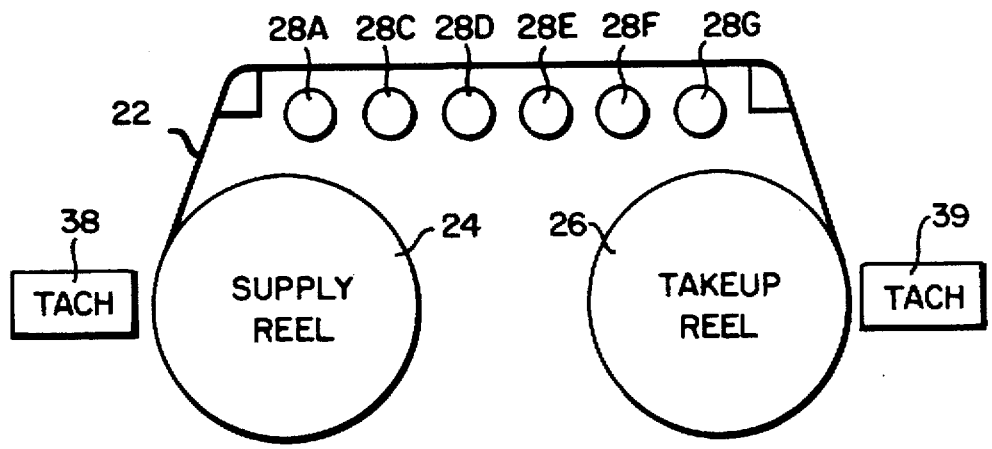
FIG. 5 is a schematic view depicting the relationship of FIG. 5A and FIG. 5B.
Figure 5A:
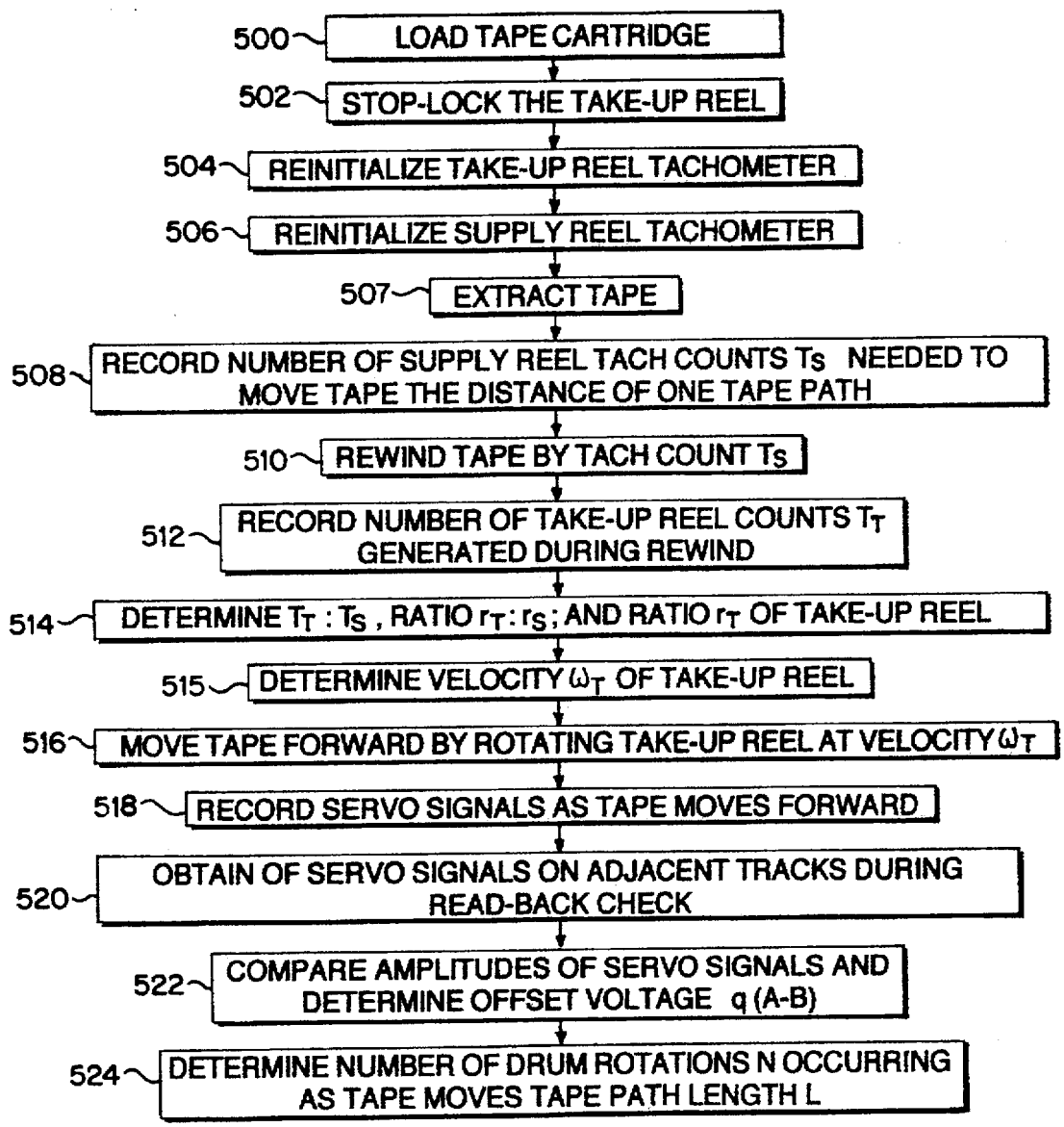
FIG. 5A and FIG. 5B constitute a flowchart depicting steps executed according to a method of operating a helical scan recording system to determine axial offset variance according to an embodiment of the invention.
Figure 5B:
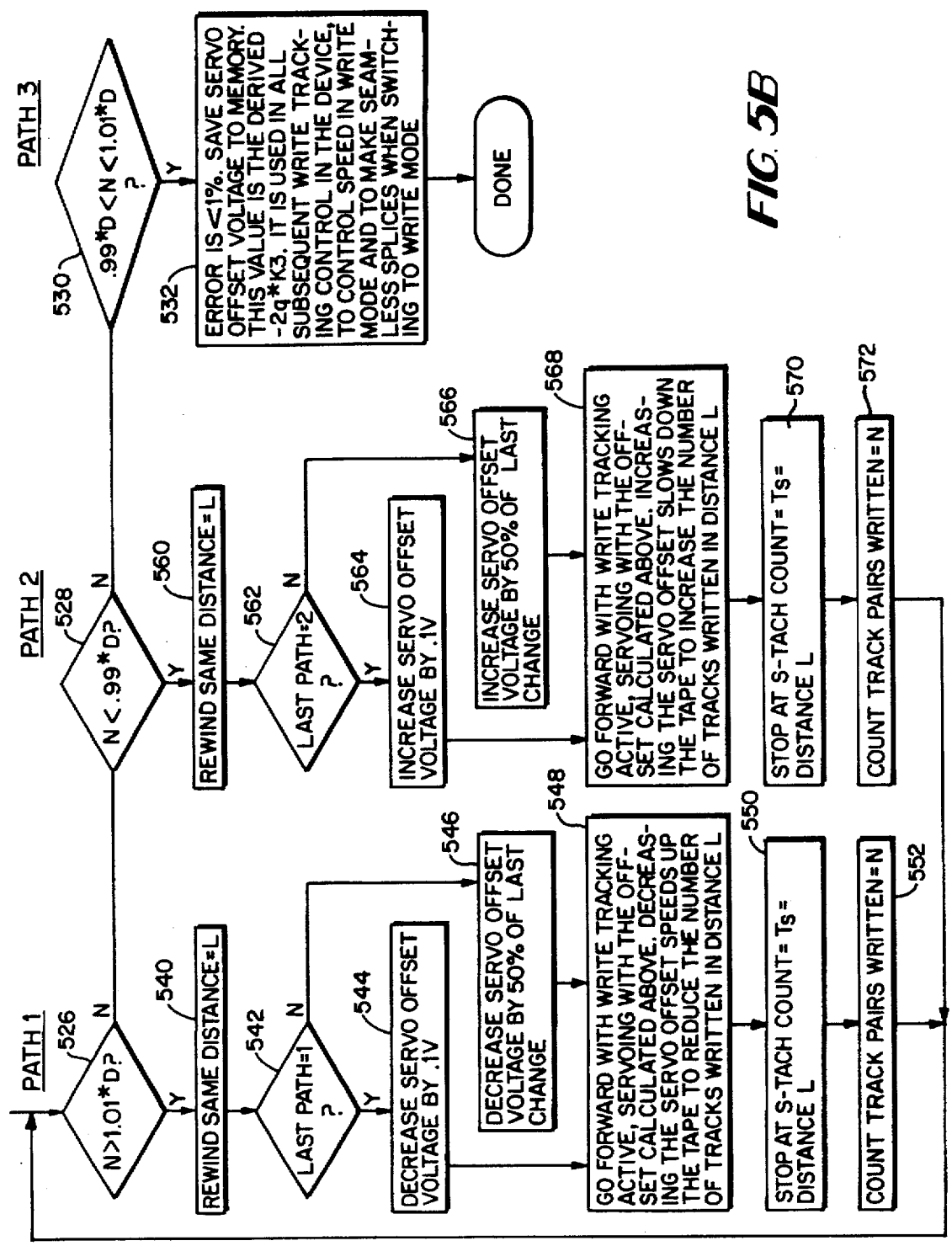

FIG. 5, which includes both FIG. 5A and FIG. 5B, shows steps executed, e.g., by servo signal processing circuitry 64 in the embodiment of FIG. 1A and FIG. 3A, in connection with a determination of servo offset 2q*K3 according to a mode of the invention, and hence with a determination of axial offset variance (AOV)=K3.

At step 500, a tape cartridge has been loaded into either the helical scan recorder system 20 of FIG. 1A or the helical scan recorder system 20' of FIG. 1B. At step 502, take-up reel 26 is stop-locked. At step 504 and step 506, counters for take-up reel tachometer 39 and supply reel tachometer 38, respectively, are re-initialized at zero.

At step 507, the tape is extracted into its tape load path, e.g., the tape is moved from the position shown in FIG. 1C to the tape load or tape extracted position shown in FIG. 1A. As the tape is being extracted, supply reel 24 rotates and, at step 508, supply reel tachometer 38 monitors the degree of rotation, and hence the angular position, of supply reel 24. That is, at step 508, system 20 records the number of supply reel tach counts $T_S$ needed to move the tape the distance L of one tape path. This tape path length distance L is a fixed distance on any tape.

Incidentally, the determination of $T_S$ at step 508 allows calculation of the radius of the supply reel $r_S$ according to Equation 4:

$$2*\pi*r_S/TPR=L/T_S \quad \text{[Equation 4]}$$

wherein TPR is the number of supply reel tachs per revolution of supply reel 24; L is the length of one tape path; and $T_S$ is the number of supply reel tach counts needed to move the tape the distance L of one tape path.

At step 510, take-up reel 26 is unlocked and supply reel motor 50 is reversed to rewind the tape. The rewind is conducted so that supply reel 24 is rotated precisely so that tachometer 38 senses the same number $T_S$ of supply reel tach counts needed to move the tape the distance L of one tape path. During the rewind of step 510, the number of tach counts $T_T$ sensed by take-up reel tachometer 39 is recorded (as indicated by step 512).

In connection with the foregoing steps culminating in the rewind of step 510, it should be understood that, should the beginning of tape (BOT) clear leader be sensed at any time, the process is stopped, the tape is advanced forward, and the foregoing steps repeated. Such forwarding, when necessary, facilitates the rewinding of step 510.

At step 514, the ratio $T_T$:$T_S$ is calculated, which gives the ratio of radii of take-up reel 26 and supply reel 24, e.g., the ratio $r_T$:$r_S$. As part of step 512, the ratio $T_T$:$T_S$, and the ratio $r_T$:$r_S$ determined therefrom, are used to determine a desired (e.g., an initial) velocity $\omega_T$ of take-up reel 26.

With respect to the determination of steps 514 and 515, let $\omega_T$ represent the (angular) velocity of take-up reel 26 (in revolutions per second) and $\omega_S$ the (angular) velocity of supply reel 24 (in revolutions per second). The tape speed TS is provided by Equation 5:

$$\omega_T*r_T=\omega_S*r_S=TS \quad \text{[Equation 5]}.$$

Moreover, since take-up reel 26 and supply reel 24 are connected through the tape, $$r_T/r_S=\omega_S/\omega_T=TCPS_S/TCPS_T \quad \text{[Equation 6]}$$

wherein $TCPS_S$ is the number of supply reel tach counts generated per second and $TCPS_T$ is the number of take-up reel tach counts generated per second. Then, over an appropriate interval to obtain sufficient resolution, e.g., over one rotation of the largest reel (typically supply reel 24), a value for $r_T$ can be determined according to Equation 7:

$$r_T=r_S* TC_S/TC_T \quad \text{[Equation 7]}$$

wherein $TC_S$ is the number of supply reel tach counts (as determined by tachometer 38) over the appropriate interval and $TC_T$ is the number of take-up reel tach counts (as determined by tachometer 39) over the appropriate interval.

Then, knowing $r_T$ from Equation 7, substitution is made into Equation 5 to convert the desired tape speed to a rotational velocity $\omega_T$. Control of the rotational velocity $\omega_T$ of take-up reel 26 is achieved by servoing the take-up reel tachometer period TACH_PERIOD$_T$ to a number derived by Equation 8:

$$\text{TACH\_PERIOD}_T = 1/(\omega_T \cdot \text{TPRR}_T) \quad \text{[Equation 8]}$$

wherein TPRR$_T$ represents the number of tachometer pulses from tachometer 39 per revolution of take-up reel 26.

The desired velocity $\omega_T$ of take-up reel 26 having been thusly determined as part of step 514, at step 516 take-up reel 26 is rotated at velocity $\omega_T$ for moving the tape forward. As tape movement occurs at step 516, servo signals are recorded (e.g., by an appropriate write head) on the tape as indicated at step 518. Moreover, also during tape movement, as indicated by step 520, a read-back check operation is conducted, wherein servo signal recorded on adjacent servo-bearing tracks are read back after writing. At step 522, the amplitudes of servo signals recorded on adjacent servo-bearing tracks are compared and the offset voltage q(A–B) is determined.

As the tape is moved during step 516, servo signal processing circuitry 64 counts the number of drum rotations N occurring as the tape moves the distance L (i.e., the tape path length). In this regard, servo signal processing circuitry 64 monitors the signal S-reel_motor_count$_{actual}$ from supply reel tachometer 38 and knows when the tape has travelled the distance L by reference to the earlier recorded tach count T$_S$. It is noted that the number of drum rotations N over any distance equals the number of track pairs written over that same distance.

Turning now to the steps of FIG. 5B, three processing paths are provided in connection with a binary search procedure. The three paths are Path 1, Path 2, and Path 3, each path being associated with a column of steps as depicted in FIG. 5B. Routing to a particular path is in accordance with results of decision symbols 526, 528, 530 which are illustrated at the top of each column in FIG. 5B.

At step 526 circuitry 64 determines whether N (as determined at step 524) exceeds 1.01*D. "D" is the desired number of track pairs recorded per tape path length, which is a constant having a value obtained from Equation 9:

$$D = L/TP \quad \text{[Equation 9]}$$

in which L is the tape path length and TP is the linear track pitch, both of which are known constants for any given device.

If the determination at step 526 is negative, step 528 is executed. Otherwise, path 1 (i.e., steps 540–552) is executed. At step 528, a check is made whether N is less than 0.99*D. If the determination at step 528 is negative (meaning that 0.99*D<N<1.01*D, as reflected by symbol 530), step 532 is executed. Otherwise, path 2, i.e., steps 560–572, is executed.

As mentioned above, steps 540–552 are executed in the event it is determined at step 526 that N exceeds 1.01*D. At step 540, the tape is rewound by the distance L. At step 542, the value of a flag "Last Path" is checked. The flag "Last Path" inquires as to which of the three paths (e.g., path 1, path 2, or path 3) had last been executed prior to embarking upon the current path. That is, at step 542, a check is made whether path 1 was the path executed immediately preceding the current execution of path 1. If flag "Last Path" has been set to "1" as determined at step 542, at step 544 the servo offset voltage q(A–B) is decreased by 0.1 volt. Otherwise, at step 546, the servo offset voltage is decreased by an amount corresponding to 50% of the previous change. The value determined at steps 544 and 546 is applied to reel motor control circuit 54 to control positioning of the heads.

From either step 544 or 546, processing continues at step 548. At step 548, the tape is moved in the forward direction, with the recording, reading back, and comparison processing of servo signals being conducted in like manner as described above with reference to steps 518–522. It is noted in connection with the reduction of the servo offset voltage (either by the amount required by step 544 or the amount required by step 546), that such reduction serves to speed up the tape, and thereby to reduce the number of tracks recorded in the distance L.

As indicated by step 550, tape movement during step 548 is limited so that the tape moves only the distance L. Such limitation of tape movement is achieved with reference to the counting of pulses from supply reel tachometer 38, and comparison of such count to the previously determined value T$_S$.

As indicated by step 552, during the tape movement and recording of step 548, the number of track pairs written (e.g., the number of drum rotations "N") is counted and recorded. The number N ascertained at step 552 then becomes a "new" N so that the check of step 526, and if necessary, the check of step 528, can be conducted therewith.

As mentioned above, steps 560–572 are executed in the event it is determined at step 528 that N is less than 0.99*D. Processing conducted in even number steps 560–572 is analogous to the processing conducted in corresponding even numbered steps 540–552, respectively, with the exceptions that step 562 checks to determine if the value of flag "Last Path" is 2, and that the voltage offset changes in steps 564 and 566 are increases rather than decreases (although by the same degrees). The value determined at steps 544 and 546 is applied to reel motor control circuit 54 to control positioning of the heads. As a result of the increase in servo offset voltage, the tape moving, servo recording, servo reading, and servo comparison of step 568 slows down the tape, thereby causing an increase in the number of tracks recorded during the distance L. A "new" N value is similar determined at step 572, whereupon the check of step 526 and possibly the check of step 528 are conducted.

When a value of N has been achieved so that error is less than 1%, i.e., 0.99*D<N<1.01*D, the current servo offset voltage is stored, i.e., in memory 122. This stored servo offset voltage value corresponds to the quantity 2q*K3, which is understood with reference the discussions surrounding Equation 3 above. This stored value is used in all subsequent write tracking control, to control speed in a write or record mode, and to achieve seamless slices when switching to a write or record mode.

WRITE SPLICE OPERATION

Figure 6:
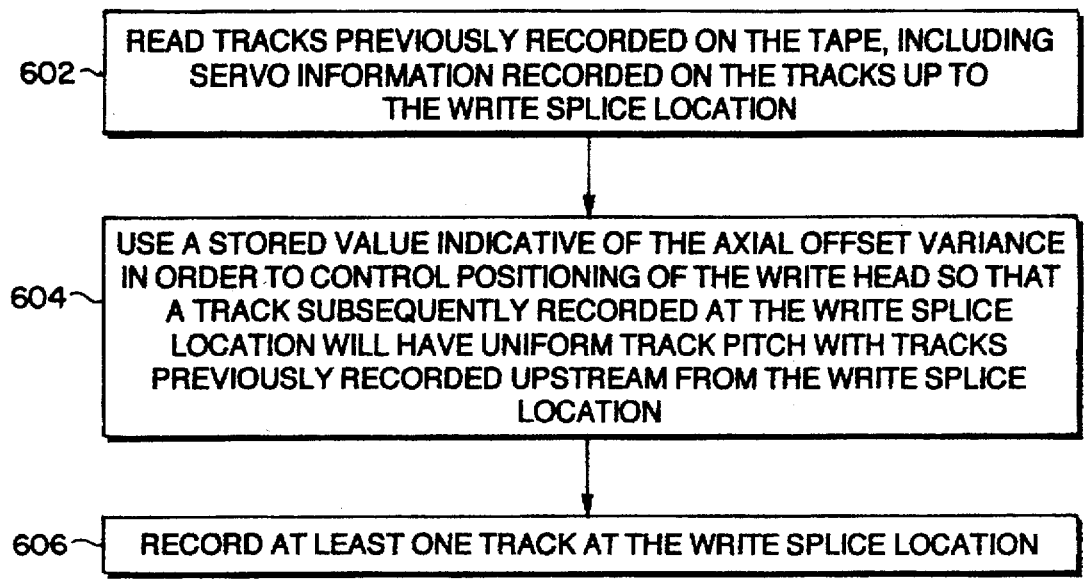
FIG. 6 is a flowchart depicting steps executed according to a method of executing a write splice operation using a helical scan recording system.

FIG. 6 shows basic steps applicable to a write splice operation for either the helical scan recorder system 20 of FIG. 1A or the helical scan recorder system 20' of FIG. 1B. At step 602, tracks previously recorded on the tape (22 or 22') are read up to the write splice location. In connection with previous track reading at step 602, however, as indicated by step 604 the servoing scheme is altered in anticipation of a write splice. In particular, the servo controller (64 or 152') uses the stored value indicative of the axial offset variance in order to control positioning of the heads so that, including the write heads, so that a track subsequently recorded at the write splice location will have uniform track pitch with tracks previously recorded upstream from the write splice location. In this regard, the servoing criteria is modified by setting the criteria back by the amount 2*K3. Step 606 reflects recordation of at least one new track at the write splice location (it being understood that most likely many new tracks will be recorded).

DETERMINATION OF TAPE VELOCITY UPON MID-TAPE LOAD

It should be understood that steps included in the foregoing can be utilized in accordance with the invention to determine a desired tape velocity upon a mid-tape load. Such a mid-tape load occurs, for example, when a cartridge is loaded into a helical scan recorder with the tape not rewound (e.g., not predominately packed on supply reel 24), but rather with a substantial amount of tape wound about both supply reel 24 and take-up reel 26. Controlling linear velocity of tape during a mid-tape load is generally not a problem with a capstan system such as system 20' of FIG. 1B, since the capstan can be used to impart directly the desired velocity to the tape. In a capstanless system such as system 20 Of FIG. 1A, on the other hand, a special determination must be made of the velocity at which the tape is to be transported. This is particularly problematic since the take-up reel cannot be rotated at a constant rate to obtain a constant linear tape speed.

Steps involved in the mid-tape load velocity determination of the present invention are shown in FIG. 8. It is presumed, in connection with the mid-tape load velocity determination, that the cartridge has been loaded (as in the manner of step 500 of FIG. 5A); that the supply reel and take-up reel tachometers 38 and 39, respectively, have been re-initialized; and that the take-up reel 26 has been stop locked.

At step 800, tape 22 is extracted into the tape path of the capstanless helical scan recorder, whereby the tape travels the predetermined tape extraction displacement (L). Then, at step 802, circuitry 64 determines an extraction angular displacement of the supply reel necessary to extract the tape into the tape path in accordance with step 800. Step 802 is thus a determination of $T_S$ as aforedescribed.

At step 804, the extraction angular displacement of the supply reel determined in step 802 (i.e., $T_S$) is used to determine the radius of the supply reel ($r_S$). The determination of $r_S$ at step 804 is understood in connection with the foregoing description of step 514, particularly Equation 4.

At step 806 the tape is rewound by the tape extraction displacement (i.e., "L"). As the tape is rewound in step 806, at step 810 a rewind angular displacement of the take-up reel is determined and recorded (i.e., the tach value $T_T$ previously discussed).

At step 812, with the tach value $T_T$ known, the radius $r_T$ of take-up reel 26 is determined. The determination of radius $r_T$ is understood with reference to aforediscussed step 512, and particularly Equation 7. With the radius $r_T$ thusly determined at step 812, at step 814 circuitry 64 determines what at what rotational velocity take-up reel 26 must be driven in order to impart a desired linear velocity to the tape. The determination of step 814 is in accordance with the well-known formula v=ωr, which is solved at step 814 for rotational velocity of the take-up reel $\omega_R = v/r_T$, v being the desired constant linear velocity of the tape (an input parameter). A signal tape_speed_correction indicative of $\omega_R$ is then applied by circuitry 64 to reel motor control circuit 54, for the driving of take-up reel motor 52 at the velocity $\omega_R$ as determined at step 814.

Thus, the mid-tape load velocity determination of the present invention provides for fast and ready determination of tape linear velocity for a capstanless system without requirement to rewind to the beginning of the tape.

While the invention has been particularly shown and described with reference to the preferred embodiments thereof, it will be understood by those skilled in the art that various alterations in form and detail may be made therein without departing from the spirit and scope of the invention. Moreover, although the particular media illustrated herein is magnetic tape, the invention is not limited thereto but can be used with other media employed in a helical scan environment.

The embodiments of the invention in which an exclusive property or privilege is claimed are defined as follows:

1. A method for determining an angular velocity of a take-up reel of a helical scan recorder in order to achieve a desired tape linear velocity, the method comprising:

(1) extracting the tape into a tape path of the helical scan recorder, whereby the tape travels a predetermined tape extraction displacement;

(2) determining an extraction angular displacement of the supply reel necessary to extract the tape into the tape path in accordance with step (1);

(3) using the extraction angular displacement of the supply reel determined in step (2) to determine the radius of the supply reel;

(4) rewinding the tape by the tape extraction displacement;

(5) determining a rewind angular displacement of the take-up reel as a result of the rewinding of step (4);

(6) using the determination of step (2) and the determination of the rewind angular displacement of the take-up reel to determine the angular velocity of the take-up reel which achieves the desired tape linear velocity;

imparting the angular velocity determined in step (6) to the take-up reel.

2. The method of claim 1, wherein a mid-tape load rotational velocity of the take-up reel is determined in order to achieve a predetermined linear velocity of the tape.

3. The method of claim 1, wherein step (2) comprises determining a number of supply reel tachometer pulses $T_S$ generated as the tape travels the tape extraction displacement.

4. The method of claim 3, wherein the radius of the supply reel $r_S$ is determined in step (3) by the following equation:

$$2*\pi*r_S/TPR = L/T_S$$

wherein

L is a predetermined tape path length from the supply reel to the take-up reel, and TPR is the number of supply reel tachs per revolution of the supply reel.

5. The method of claim 1, further comprising the steps of:

(7) moving the tape from the supply reel to the take-up reel by the predetermined tape extraction displacement of step (1) while using a head to record servo information on two adjacent servo-bearing tracks of the tape;

(8) reading the servo information recorded on the two adjacent servo-bearing tracks and using the read servo information to determine a servo offset value;

(9) adjusting the servo offset value so that a number of revolutions N of a drum which occurs during a repetition of step (7) is within a predetermined range, the head being mounted on the drum; and

(10) using the adjusted servo offset value to control positioning of the head.

6. A helical scan recorder apparatus which records information on a magnetic tape, the magnetic tape being transported in a tape path between a supply reel and a take-up reel in the helical scan recorder, the recorder apparatus comprising:

a tape system for conducting a tape extraction operation for extracting the tape into the tape path;

means for imparting linear velocity to the tape;

a supply reel sensor for determining a degree of supply reel rotation;

a take-up reel sensor for determining a degree of take-up reel rotation;

a processor which uses the degree of supply reel rotation obtained from the supply reel sensor during the tape extraction operation and the degree of take-up reel rotation obtained from the take-up reel sensor during a tape rewind operation to control the means for imparting linear velocity to the tape.

7. The apparatus of claim 6, wherein the means for imparting linear velocity to the tape comprises a take-up reel motor for driving the take-up reel.

8. The apparatus of claim 6, wherein the means for imparting linear velocity to the tape comprises a capstan.

* * * * *